United States Patent
Kamenoff

(10) Patent No.: US 6,900,615 B2
(45) Date of Patent: May 31, 2005

(54) BATTERY DISCHARGE APPARATUS WITH LIGHT ACTIVATED BATTERY DISCHARGE CIRCUIT

(75) Inventor: Robert Kamenoff, Port Orange, FL (US)

(73) Assignee: Mathews Associates, Inc., Sanford, FL (US)

( * ) Notice: Subject to any disclaimer, the term of this patent is extended or adjusted under 35 U.S.C. 154(b) by 50 days.

(21) Appl. No.: 10/452,738

(22) Filed: Jun. 2, 2003

(65) Prior Publication Data

US 2004/0012374 A1 Jan. 22, 2004

Related U.S. Application Data

(60) Provisional application No. 60/396,292, filed on Jul. 17, 2002.

(51) Int. Cl.[7] .............................................. H01M 10/46
(52) U.S. Cl. ...................................................... 320/127
(58) Field of Search ............................... 320/101, 127, 320/129, 135; 429/61, 111; 136/291, 293

(56) References Cited

U.S. PATENT DOCUMENTS

| | | | |
|---|---|---|---|
| 3,300,770 A | 1/1967 | Brousseau et al. .......... 340/280 |
| 3,432,842 A | 3/1969 | Poznanski .................... 340/280 |
| 4,183,019 A | 1/1980 | Lekhtman .................... 340/539 |
| 4,328,456 A | * 5/1982 | Suzuki et al. ................ 320/101 |
| 4,394,613 A | 7/1983 | Cole ............................. 320/48 |
| 4,407,909 A | 10/1983 | Goebel ......................... 429/50 |
| 4,695,435 A | 9/1987 | Spector ........................ 422/124 |
| 5,119,009 A | 6/1992 | McCaleb et al. ............. 320/13 |
| 5,185,564 A | 2/1993 | Miller ........................... 320/2 |
| 5,477,130 A | 12/1995 | Hashimoto et al. .......... 320/49 |
| 5,936,523 A | 8/1999 | West ........................ 340/545.6 |
| 6,270,916 B1 | 8/2001 | Sink et al. ..................... 429/7 |

FOREIGN PATENT DOCUMENTS

JP 56-121270 9/1981 .......... H01M/10/44

* cited by examiner

Primary Examiner—Edward H. Tso
(74) Attorney, Agent, or Firm—Allen, Dyer, Doppelt, Milbrath & Gilchrist, P.A.

(57) ABSTRACT

An apparatus and method for discharging a battery includes a battery discharge circuit contained within the battery that, when actuated, discharges the battery. A light sensing circuit is operatively connected to the battery discharge circuit and actuates the battery discharge circuit after exposing to light the light sensing circuit.

26 Claims, 3 Drawing Sheets

US 6,900,615 B2

BATTERY DISCHARGE APPARATUS WITH LIGHT ACTIVATED BATTERY DISCHARGE CIRCUIT

RELATED APPLICATION

This application is based upon prior filed provisional application Ser. No. 60/396,292 filed Jul. 17, 2002.

FIELD OF THE INVENTION

This invention relates to an apparatus and method for discharging a battery, such as primary or rechargeable, for example, lithium, batteries.

BACKGROUND OF THE INVENTION

Federal, state and local agencies require many types of batteries, including primary or rechargeable batteries, for example lithium batteries as one example only, to be discharged completely prior to discarding the battery. Many batteries must be disposed of in a reliable manner because of the inherent risk of fire or explosion created by the improper use or disposal of batteries. As hazardous batteries become more commonplace to power personal and commercial equipment, it is necessary to improve battery discharge systems associated with these types of hazardous batteries and overcome prior art reliability problems relative to battery discharge, such as caused by moving components, and/or sealing problems. Often, water seeps into a battery casing, and if a hazardous cell, such as lithium, contacts the water, it could explode. Thus, it is required to fully dissipate any battery charge, such as a lithium battery, before it can be disposed to minimize the chance of explosion or fire.

Typically, prior art batteries have often been discharged using external clip leads and resistors. This method is generally crude and unreliable. It could also create a shock potential. Other battery discharge systems offer some improvement, but still pose problems. For example, U.S. Pat. No. 6,270,916 to Sink et al. discloses a complete discharge device for a lithium battery that is more reliable than an external clip and resistor. It uses internal electromechanical switches and resistors, and "pull tabs" that are accessed via access holes formed in the battery case. This type of battery Complete Discharge Device (CDD) uses a CDD actuator that is or may be prone to self-activation under physical abuse conditions. A switch, formed of a switch contact, such as a spring contact, is biased toward a contact pad. When the contact and contact pad meet, the discharge circuit is activated. Other prior art battery discharge devices use switches that can be actuated by knobs, handles or screws. These actuation devices can typically be accessed from outside the battery by removing a watertight cover or instruction label.

Other patents disclose different types of battery discharge systems, such as U.S. Pat. Nos. 4,407,909; 4,695,435; 5,119,009; and 5,185,564. The '009 patent discloses another manually operated switch that selectively couples the discharge mechanism to at least one lithium cell to complete discharge. The '564 patent discloses a battery discharge apparatus using a strap for mounting a housing to a battery and having adjustable contact members. Similar to other prior art battery discharge mechanisms and systems, these disclosed systems could be unreliable because they often use electromechanical and/or other types of moving or unreliable parts.

There is also a requirement that batteries be watertight. This requirement becomes critical when the battery contains a lithium cell that could explode upon contact with water. To meet this stringent design requirement, a watertight seal is often provided between the battery casing and any actuator used for actuating a battery discharge circuit. In some battery designs, this is accomplished by using a "peel off" label over an access hole, or a nylon seal positioned between an actuator and a battery casing. These seals, however, have often proven unreliable, particularly when the internal pressure in the battery increases because of temperature changes or altitude changes.

SUMMARY OF THE INVENTION

The present invention overcomes the reliability and sealing problems associated with many prior art battery discharge systems, such as used with primary or rechargeable, for example, lithium batteries, which typically also include a battery discharge circuit. The present invention uses a light sensing circuit, such as an optically actuated electronic switch, which contains no moving parts, and is connected to the battery discharge circuit such that the battery discharge circuit is actuated after exposing to light the light sensing circuit.

The light sensing circuit is preferably mounted within the battery. The battery can have an opening (preferably watertight) formed in the battery casing through which ambient light enters for exposing the light sensing circuit. A removable, opaque cover is positioned over the opening and blocks light from passing onto the light sensing circuit. Upon removal of the opaque cover, the light sensing circuit is exposed to light. A lense is preferably positioned and sealed in a watertight manner at the opening to prevent water from passing into the battery and engaging a battery, for example, a lithium cell or other similarly hazardous cell. The lense allows light through the opening and onto the light sensing circuit upon removal of the cover. In one aspect of the present invention, the cover comprises a removable label adhesively secured onto the battery.

In another aspect of the present invention, a latching circuit latches the battery discharge circuit into an "ON" condition to maintain battery discharge even when the light sensing circuit is no longer exposed to light. An arming circuit can be provided to arm the light sensing circuit for operation after battery assembly. During assembly, the arming circuit would prevent activation of the battery discharge circuit even when the light sensing circuit is exposed to light. The arming circuit can comprise, for example, a switch, a jumper, or a circuit card in which the light sensing circuit is mounted. The circuit card can have a breakable tab, which upon breaking, arms the light sensing circuit.

In yet another aspect of the present invention, the light sensing circuit comprises a light detecting device, such as a light dependent resistor and operational amplifier connected thereto, which switches on the battery discharge circuit after the light dependent resistor is exposed to light. The light sensing circuit could also be formed from a photocell, such as a photodiode or phototransistor. The battery discharge circuit can also include a light emitting diode that is operative for remaining "ON" during discharge, visually indicating that the battery is draining.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention solves both reliability and sealing problems that often occurs with many prior art batteries having battery discharge circuits for discharging primary or rechargeable, for example, lithium and similarly hazardous battery cells. The present invention uses a light sensing circuit operatively connected to the battery discharge circuit contained in the battery casing to actuate the battery discharge circuit after exposing to light the light sensing circuit. In one aspect of the present invention, the light sensing circuit can be mounted within the battery and can be formed as a photocell, such as a photodiode or phototransistor, or formed as light dependent resistor that is operative with an operational amplifier (op-amp) and transistor circuit that acts as a switching circuit to actuate the battery discharge circuit after exposing the photocell, light dependent resistor, photodiode or phototransistor to light.

Figure 1:
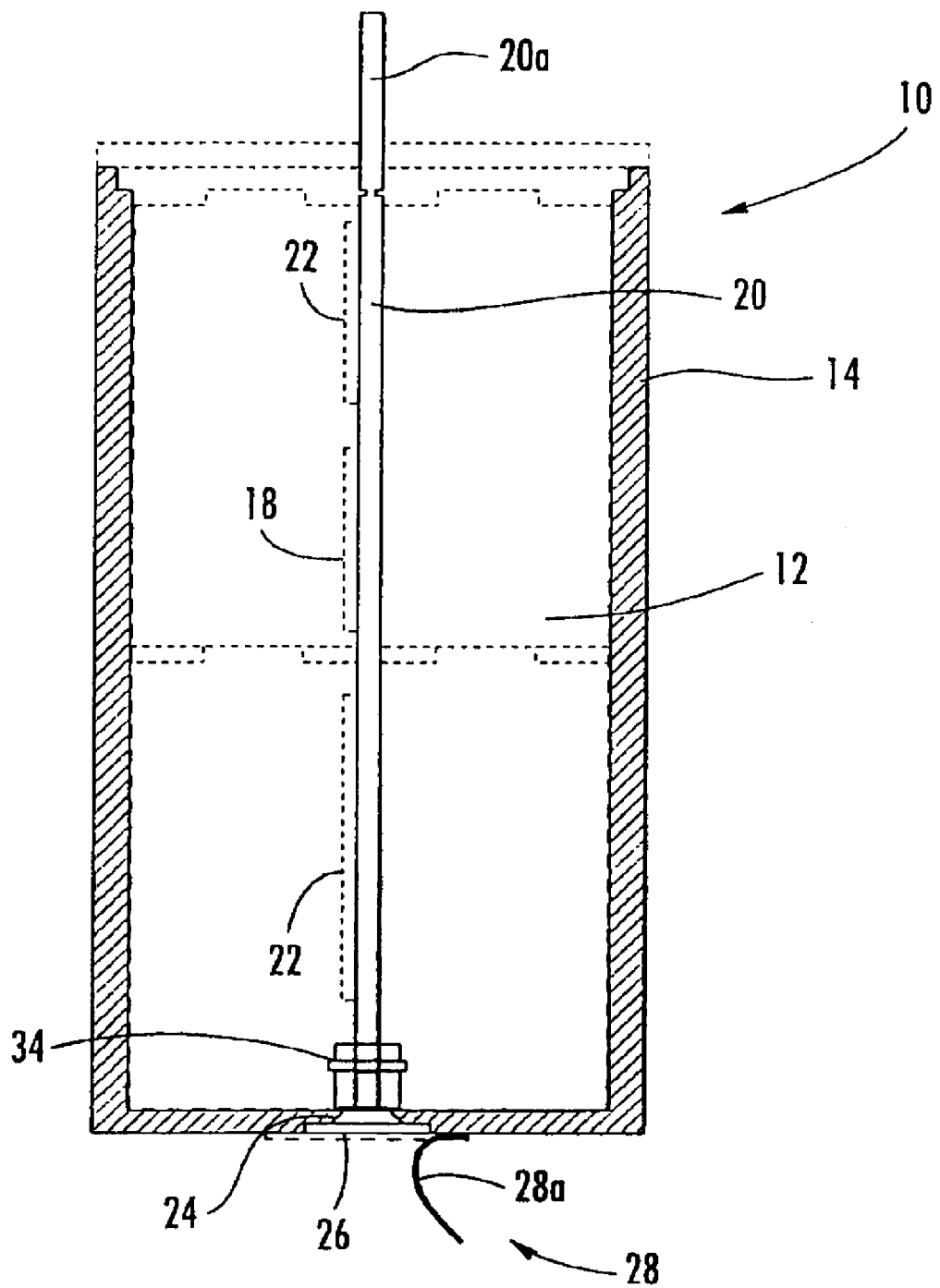
FIG. 1 is a fragmentary, sectional view of a battery and showing basic components for discharging the battery in accordance with the present invention, including a photocell as a light sensing circuit, an opaque pull tab, a transparent lense within a "window" opening of the battery casing, a circuit card that mounts components and includes a break-off tab, and the battery cells, such as lithium cells.
Figure 2:
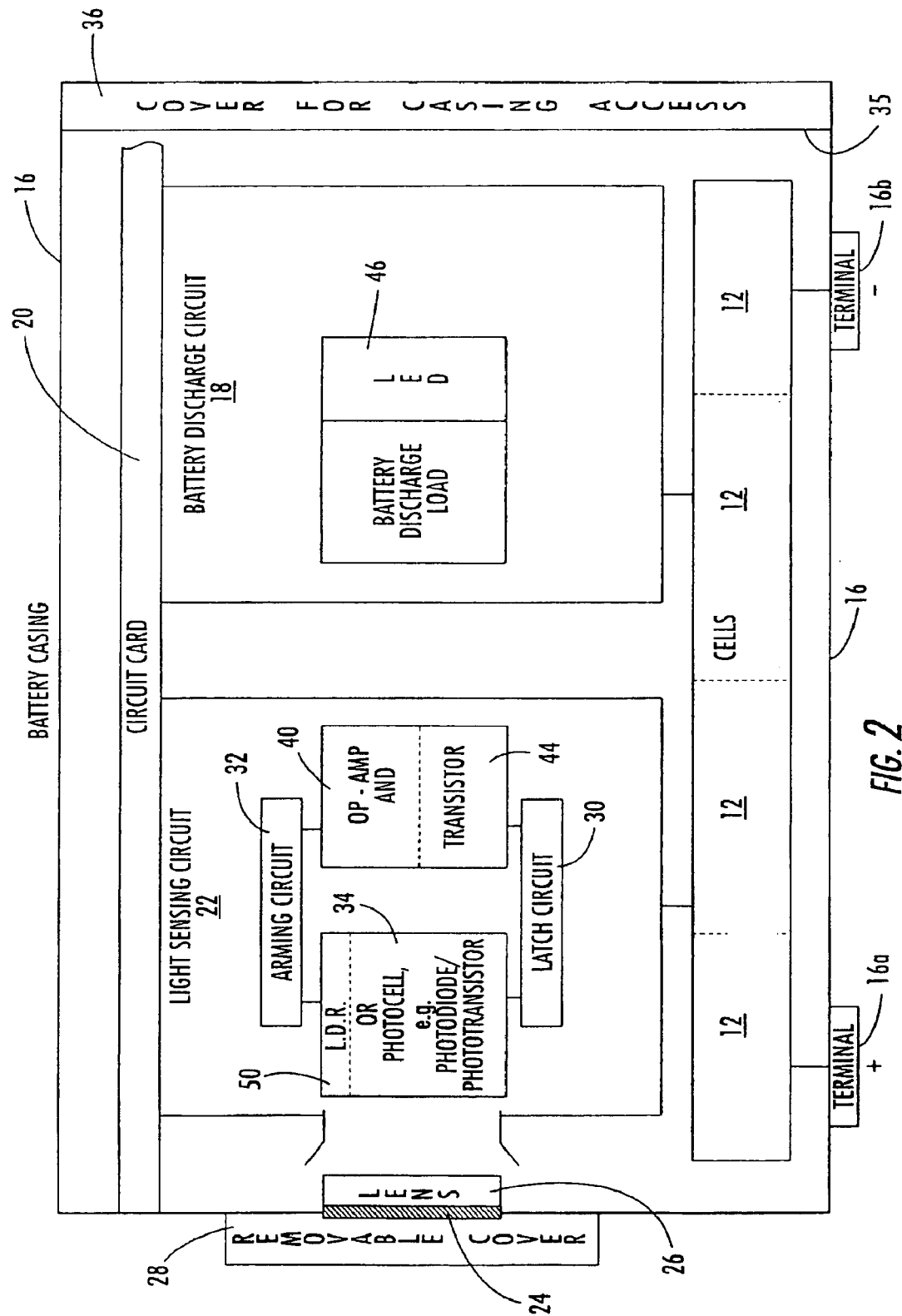
FIG. 2 is a high level block diagram showing basic components used in the apparatus for discharging a battery in accordance with the present invention.

As shown in FIGS. 1 and 2, the apparatus of the present invention used for discharging a battery is shown, and includes a battery, such as a primary or rechargeable, for example, a lithium battery as a non-limiting example, having a number of battery cells 12 contained within a battery casing 16. The battery casing 16 includes positive and negative terminals 16a, 16b, which interconnect the battery cells 12. A battery discharge circuit 18 is contained within the battery casing 16, such that when actuated, discharges the battery, and more particularly, the battery cells 12.

In one aspect of the present invention, the battery discharge circuit 18 is formed on a circuit card 20 that is positioned such as in a medial portion of the battery casing 16, as a non-limiting example. A light sensing circuit 22 is operatively connected to the battery discharge circuit 18 and actuates the battery discharge circuit 18 after exposing to light the light sensing circuit. This circuit 22 also can be formed on the circuit card 20. The battery casing 16 preferably includes an opening 24 that forms a "window" for exposing the light sensing circuit 22 to light. This opening 24 preferably includes a lense 26, such as a transparent or substantially translucent lense, which can be formed from glass, plastic or other material known to those skilled in the art. The lense 26 is positioned within the opening 24 and sealed to form a watertight barrier to moisture and water. A removable and opaque cover 28 is positioned over the opening 24 and lense 26 to block light from passing onto the light sensing circuit until the cover is removed. In one aspect of the present invention, the opaque cover 28 could be a label or opaque, pull tab 28a (FIG. 1) that is adhesively secured to the battery casing and over the lense. Once the cover or tab 28, 28a is pulled from the casing, ambient light passes through the lense 26, through the opening 24, and onto the light sensing circuit 22 to actuate the battery discharge circuit 18.

As noted before, the lense 26 is preferably mounted in the opening 24 in a watertight seal to prevent water from seeping into the battery casing 16 and creating a fire hazard or explosion by contacting any lithium or other hazardous cells that have not been completely discharged. It should be understood that the watertight seal is provided by the lense 26 with the battery casing 16 and not by any pull tab, label or other cover 28 that is positioned over the opening.

Preferably the light sensing circuit 22 includes a latch circuit 30 that latches the battery discharge circuit 18 into an ON condition to maintain battery discharge even when the light sensing circuit is no longer exposed to light. A non-latching circuit could be used for the present invention, but the light sensing circuit would require continual exposure of light to fully discharge the battery. Thus, with the latching circuit, the battery can be placed in a position such that light initially exposes the light sensing circuit 22. The light source can be removed while the battery maintains its discharge process.

In yet another aspect of the present invention, an arming circuit 32 can be provided that arms the light sensing circuit 22 for operation after battery assembly. Thus, during the initial manufacturing process, the light sensing circuit 22 and battery discharge circuit 18 are disarmed and not operable. Any exposure of the light sensing circuit 22 to light will not activate the battery discharge circuit 18. At final assembly, however, the light sensing circuit, such as a light sensor, for example, a photocell 34 (FIG. 1), can be installed in the battery casing through a casing opening 35 and the opaque label placed over the lense 26 positioned in the opening 24 or "window." When the circuit is armed, a casing cover or lid 36 can be attached and sealed to the battery casing. This arming circuit could be formed as a simple switch, a removable jumper connection, or printed circuit card, break-off tab 20a (FIG. 1), which once broken off, would allow the casing cover 36 to be placed thereon.

Figure 3:
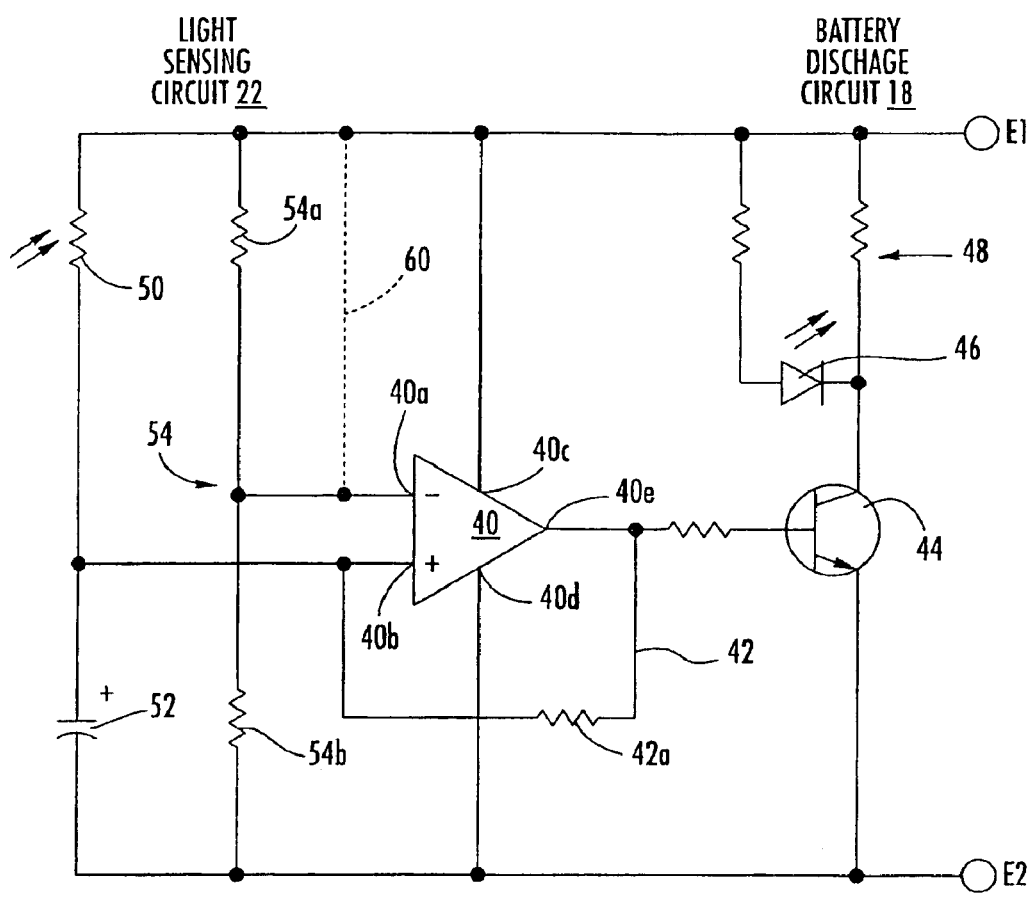
FIG. 3 is a schematic circuit diagram of the battery discharge circuit and light sensing circuit that can be used in the present invention.

FIG. 3 shows an example of one type of circuit, as a non-limiting example, which could be used for the present invention. As illustrated, an operational amplifier 40 as a differentiator or similar circuit is operatively connected to the battery cell(s) with appropriate terminals labeled E1 and E2 having a potential difference therebetween for positive and negative values. The operational amplifier 40 includes the inverting input terminal 40a and the non-inverting input terminal 40b, appropriate voltage supply terminals 40c, 40d and an output terminal 40c. As illustrated, the operational amplifier 40 has a positive feedback loop circuit 42 and loopback resistor 42a that increases output and allows the operational amplifier to drive harder to saturation. The operational amplifier 40 switches state to turn on a transistor 44 acting as a switch, such as the illustrated NPN transistor, which connects to a light emitting diode 46 and resistor circuit having a resistor network 48 also forming a battery discharge load to allow discharge of the battery or battery cell. The light emitting diode 46 also emits light and acts as a visual indication of activation and could be used for battery discharge.

The light sensing circuit 22 includes a light dependent resistor 50 (as a non-limiting example) that can be formed such as by cadmium sulfide or other resistor material. The light dependent resistor 50 has a resistance value that decreases when exposed to light. The light dependent resistor 50 is operatively connected in series to a capacitor 52. Both the resistor 50 and capacitor are parallel with a voltage divider circuit 54 having two resistors 54a, 56b to provide a voltage divided input to the inverting input terminal 40a. The capacitor 52 could be designed with circuit components to provide some low pass or other filtering function. It also provides momentary disarm (when initially connecting to the battery). When transistor 44 is switched ON, in conjunction with the switched state of the operational amplifier, the discharge of cells remains even though the resistor 50 is no longer exposed to light. The light dependent resistor 50 and capacitor 52 also form a divider circuit that provides the input to the non-inverting input terminal 50b, which as noted before, receives the positive feedback from the output terminal 40c.

In this particular example, the arming circuit 32 is illustrated as a jumper line 60 and provides a current flow direct to the inverting input terminal 40a such that even when the operational amplifier 40, transistor 44, and overall battery discharge circuit 18 are connected to the battery cells, if the light dependent resistor 50 is exposed to light, and the resistance of the light dependent resistor drops, the jumper line 60 as illustrated provides a "short" to the inverting input terminal 40a such that the operational amplifier would not saturate and switch operating states. Thus, the operational amplifier would not bias the transistor ON to actuate the battery discharge circuit and operate the light emitting diode and thus allow discharge of the battery. This jumper line 60 could be formed as part of the circuit card 20 on the tab 20a, as shown in FIG. 1, such that before the battery casing cover 36 is placed on the battery casing, the breakable tab 20a formed on the circuit card 20 is broken to break the circuit line connection, as illustrated, and arm the circuit.

It is evident that the present invention now provides a battery discharge apparatus and method that overcomes the drawbacks of the prior art, and more particularly, the reliability and sealing problems that had occurred with the prior art technology. The present invention uses no moving parts, eliminating the reliability problems associated with electromechanical devices. Because there is no requirement to physically access internal actuators from outside of the battery casing, this casing can be made with a reliable, watertight seal. Because it is not mechanically actuated, any drop, shock, vibration and other similar occurrences and mishaps cannot inadvertently activate the battery discharge circuit.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. An apparatus for discharging a battery comprising:
   a battery discharge circuit contained within the battery that when actuated, discharges the battery; and
   a light sensing circuit operatively connected to the battery discharge circuit that actuates the battery discharge circuit after the light sensing circuit is exposed to light.

2. An apparatus according to claim 1, wherein the battery comprises a primary or rechargeable battery.

3. An apparatus according to claim 1, wherein the light sensing circuit is mounted within the battery, said battery having an opening for exposing the light sensing circuit to light, and a removable opaque cover positioned over the opening that blocks light from passing onto the light sensing circuit, and upon removal exposes the light sensing circuit to light.

4. An apparatus according to claim 3, and further comprising a watertight lens positioned at the opening to prevent water from passing into the battery, while allowing light through the opening upon removal of the cover.

5. An apparatus according to claim 3, wherein the cover comprises a removable label adhesively secured onto the battery.

6. An apparatus according to claim 1, and further comprising a latch circuit that latches the battery discharge circuit in an ON condition to maintain battery discharge when the light sensing circuit is no longer exposed to light.

7. An apparatus according to claim 1, and further comprising an arming circuit that arms the light sensing circuit for operation after battery assembly.

8. An apparatus according to claim 7, wherein said arming circuit comprises one of a switch, a jumper, or a circuit card on which the light sensing circuit is mounted, said circuit card having a breakable tab that upon breaking, arms the light sensing circuit.

9. An apparatus according to claim 1, wherein said light sensing circuit comprises one of a light dependent resistor and operational amplifier connected thereto that switches on the battery discharge circuit after the light dependent resistor is exposed to light.

10. An apparatus according to claim 1, wherein said battery discharge circuit further comprises a light emitting diode that is operative for indicating activation.

11. An apparatus for discharging a battery, wherein the battery comprises a battery casing having a opening through which light can pass, and at least one cell contained within the battery casing, said apparatus comprising:
    a battery discharge circuit contained within the battery casing and operatively connected to the cell such that when actuated, discharges the cell; and
    a light sensing circuit contained within the battery casing and operatively connected to the battery discharge circuit and positioned to receive light that passes through the opening for actuating the battery discharge circuit after the light sensing circuit is exposed to light.

12. An apparatus according to claim 11, and further comprising a watertight lens positioned at the opening to prevent water from passing into the battery, but allowing light to pass through the opening.

13. An apparatus according to claim 12, and further comprising a removable cover positioned over the opening for blocking light from passing into the opening.

14. An apparatus according to claim 11, and further comprising a latch circuit that latches the battery discharge circuit in an ON condition to maintain battery discharge when the light sensing circuit is no longer exposed to light.

15. An apparatus according to claim 11, and further comprising an arming circuit that arms the light sensing circuit for operation after battery assembly.

16. An apparatus according to claim 15, wherein said arming circuit comprises one of a switch, jumper, or circuit card on which the light sensing circuit is mounted, said circuit card having a breakable tab that upon breaking, arms the light sensing circuit.

17. An apparatus according to claim 11, wherein said light sensing circuit comprises a light dependent resistor and operational amplifier connected thereto that switches on the battery discharge circuit after the light dependent resistor is exposed to light.

18. An apparatus according to claim 11, wherein said battery discharge circuit further comprises a light emitting diode that is operative for indicating activation.

19. A method of discharging a battery comprising the step of exposing to light a light sensing circuit that is operatively connected to a battery discharge circuit contained within the battery for actuating the battery discharge circuit and discharging the battery.

20. A method according to claim 19, wherein the light sensor is contained within the battery, and further comprising the step of removing an opaque cover that permits light to pass onto the light sensing circuit.

21. A method according to claim 20, wherein the step of removing the opaque cover comprises the step of removing a label from the battery.

22. A method according to claim 19, and further comprising the step of latching the battery discharge into an ON condition to maintain battery discharge when the light sensing circuit is no longer exposed to light.

23. A method according to claim 19, and further comprising the step of arming the light sensing circuit after battery assembly.

24. A method according to claim 23, wherein the step of arming comprises one of the step of actuating a switch, removing a jumper, or breaking a tab on a circuit board on which the light sensing circuit is mounted.

25. A method according to claim 19, and further comprising the step of exposing a light dependent resistor operatively connected to an operational amplifier that switches on the battery discharge circuit after exposing to light the light dependent resistor.

26. A method according to claim 19, and further comprising the step of illuminating a light emitting diode for indicating activation.

* * * * *